United States Patent
Chen et al.

(10) Patent No.: US 12,107,980 B2
(45) Date of Patent: Oct. 1, 2024

(54) MOBILE TERMINAL

(71) Applicant: HuiZhou TCL Mobile Communication Co., Ltd., Guangdong (CN)

(72) Inventors: Wei Chen, Guangdong (CN); Yi Huang, Guangdong (CN); Zhiwei Chen, Guangdong (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 291 days.

(21) Appl. No.: 17/616,680

(22) PCT Filed: Dec. 19, 2019

(86) PCT No.: PCT/CN2019/126544
§ 371 (c)(1),
(2) Date: Dec. 6, 2021

(87) PCT Pub. No.: WO2021/114348
PCT Pub. Date: Jun. 17, 2021

(65) Prior Publication Data
US 2022/0311850 A1    Sep. 29, 2022

(30) Foreign Application Priority Data
Dec. 12, 2019  (CN) .......................... 201911271148.8

(51) Int. Cl.
*H01Q 9/04*    (2006.01)
*H01Q 1/24*    (2006.01)
(Continued)

(52) U.S. Cl.
CPC .......... *H04M 1/0277* (2013.01); *H01Q 1/243* (2013.01); *H01Q 1/38* (2013.01); *H01Q 1/48* (2013.01); *H01Q 1/50* (2013.01)

(58) Field of Classification Search
None
See application file for complete search history.

(56) References Cited

U.S. PATENT DOCUMENTS

| | | | |
|---|---|---|---|
| 6,618,020 B2 * | 9/2003 | Wang | H01Q 9/04 343/767 |
| 7,034,763 B2 * | 4/2006 | Wang | H01Q 13/106 343/742 |

(Continued)

FOREIGN PATENT DOCUMENTS

| | | |
|---|---|---|
| CN | 101872897 | 10/2010 |
| CN | 102684726 | 9/2012 |

(Continued)

OTHER PUBLICATIONS

Notification of Office Action and Search Report Dated Aug. 26, 2020 From the State Intellectual Property Office of the People's Republic of China Re. Application No. 201911271148.8 and Its Translation Into English (13 Pages).

(Continued)

*Primary Examiner* — Tuan A Tran

(57) ABSTRACT

A mobile terminal is provided, including a front housing, wherein the front housing includes a main body and a conductive ground plate mounted on the main body, a side of the conductive ground plate is provided with a cut, and the cut is configured to divide a conductive strip as an antenna from the conductive ground plate.

18 Claims, 3 Drawing Sheets

(51) Int. Cl.
*H01Q 1/38* (2006.01)
*H01Q 1/48* (2006.01)
*H01Q 1/50* (2006.01)
*H01Q 1/52* (2006.01)
*H01Q 9/30* (2006.01)
*H04M 1/02* (2006.01)

(56) References Cited

U.S. PATENT DOCUMENTS

| | | | |
|---|---|---|---|
| 7,145,516 B2* | 12/2006 | Ko | H01Q 9/0407 |
| | | | 343/702 |
| 7,327,324 B2* | 2/2008 | Wang | H01Q 9/04 |
| | | | 343/702 |
| 7,417,591 B2* | 8/2008 | Iguchi | H01Q 1/243 |
| | | | 343/702 |
| 7,639,194 B2* | 12/2009 | Chi | H01Q 1/38 |
| | | | 343/702 |
| 7,830,321 B2* | 11/2010 | Fukuchi | H01Q 13/10 |
| | | | 343/767 |
| 8,823,596 B2* | 9/2014 | Chen | H01Q 1/243 |
| | | | 343/893 |
| 8,836,584 B2 | 9/2014 | Kim et al. | |
| 8,933,842 B2 | 1/2015 | Ayatollahi et al. | |
| 9,088,077 B2* | 7/2015 | Chang | H01Q 21/28 |
| 9,172,146 B2* | 10/2015 | Ishikawa | H01Q 21/245 |
| 9,246,228 B2* | 1/2016 | Lee | H01Q 15/0086 |
| 9,276,322 B2* | 3/2016 | Ban | H01Q 13/106 |
| 9,350,072 B2* | 5/2016 | Park | H01Q 1/521 |
| 9,379,432 B2* | 6/2016 | Ishikawa | H01Q 21/28 |
| 9,570,813 B2* | 2/2017 | Dou | H01Q 1/245 |
| 9,577,318 B2* | 2/2017 | Pascolini | H01Q 13/10 |
| 9,595,764 B2* | 3/2017 | Loftus | H01Q 1/50 |
| 9,735,461 B2* | 8/2017 | Lo Hine Tong | H01Q 1/243 |
| 10,116,042 B2 | 10/2018 | Nakano et al. | |
| 10,177,440 B2 | 1/2019 | Jung et al. | |
| 10,665,950 B2* | 5/2020 | Yonei | H01Q 13/16 |
| 11,233,329 B2* | 1/2022 | Sampo | H01Q 5/35 |
| 2003/0193437 A1 | 10/2003 | Kangasvieri et al. | |
| 2009/0231215 A1 | 9/2009 | Taura et al. | |
| 2012/0313825 A1 | 12/2012 | Kuramoto et al. | |
| 2016/0190868 A1* | 6/2016 | Shao | H02J 50/402 |
| | | | 343/700 MS |
| 2017/0025759 A1 | 1/2017 | Lee et al. | |
| 2017/0141471 A1* | 5/2017 | Taachouche | H01Q 9/0457 |
| 2018/0261921 A1* | 9/2018 | Ha | H01Q 9/42 |
| 2020/0076081 A1* | 3/2020 | Ha | H04M 1/0277 |

FOREIGN PATENT DOCUMENTS

| | | |
|---|---|---|
| CN | 102763274 | 10/2012 |
| CN | 102884680 | 1/2013 |
| CN | 103259081 | 8/2013 |
| CN | 103650241 | 3/2014 |
| CN | 203747036 | 7/2014 |
| CN | 205081814 | 3/2016 |
| CN | 106374193 | 2/2017 |
| CN | 107293844 | 10/2017 |
| CN | 109088146 | 12/2018 |

OTHER PUBLICATIONS

International Search Report and the Written Opinion Dated Sep. 2, 2020 From the International Searching Authority Re. Application No. PCT/CN2019/126544 and Its Translation of Search Report Into English. (8 Pages).

* cited by examiner

MOBILE TERMINAL

RELATED APPLICATIONS

This application is a National Phase of PCT Patent Application No. PCT/CN2019/126544 having International filing date of Dec. 19, 2019, which claims the benefit of priority of Chinese Patent Application No. 201911271148.8 filed on Dec. 12, 2019. The contents of the above applications are all incorporated by reference as if fully set forth herein in their entirety.

FIELD AND BACKGROUND OF THE INVENTION

The present disclosure relates to the technical field of electronic equipment, and particularly to a mobile terminal.

Mobile terminals are important radio communication equipments, and an antenna of the mobile terminals is necessary for the mobile terminals to realize radio communication, which carries important functions of the mobile terminals to send and receive signals, and is also an important factor affecting communication quality of the mobile terminals.

At present, the antennas of mobile terminals are generally implemented by adopting flexible printed circuit (FPC) antenna or laser direct structuring (LDS) antenna. However, implementations of such mobile terminal antennas require appropriate antenna materials and corresponding antenna brackets, which will lead to a problem of higher material costs.

SUMMARY OF THE INVENTION

Embodiments of the present application provide a mobile terminal to reduce material costs of the mobile terminal antenna.

For solving the above problems, embodiments of the present application provide a mobile terminal comprising: a front housing, wherein the front housing comprises a main body and a conductive ground plate mounted on the main body, a side of the conductive ground plate is provided with a cut, and the cut is configured to divide a conductive strip as an antenna from the conductive ground plate; and wherein the cut comprises a first slit and a second slit that connect with each other, the first slit and the second slit are not in a straight line, one end of the conductive strip is a free end, and the other end of the conductive strip is connected to the remaining conductive ground plate.

Wherein the first slit and the second slit are connected in an L shape.

Wherein a length of the conductive strip is in a range of 30 to 50 mm.

Wherein a width of the conductive strip is in a range of 3 to 5 mm.

Wherein a distance between the conductive strip and an upper end of the mobile terminal is less than a distance between the conductive strip and a lower end of the mobile terminal.

Wherein the main body is an insulating plate, the insulating plate is provided with an embedding groove, and the conductive ground plate is embedded in the embedding groove.

Wherein the mobile terminal further comprises a circuit board located below the front housing and a connecting elastic sheet between the front housing and the circuit board, one end of the connecting elastic sheet is electrically connected to the circuit board, and the other end of the connecting elastic sheet is electrically connected to the conductive strip.

Wherein an antenna matching circuit is provided on the circuit board, and the antenna matching circuit is electrically connected to the conductive strip through the connecting elastic sheet.

Wherein a number of the cuts is one or more.

Wherein a number of the cut is multiple, and the multiple cuts are seperatedly distributed on two adjacent sides or two opposite sides of the conductive ground plate.

For solving the above problems, embodiments of the present application provide a mobile terminal, comprising: a front housing, wherein the front housing comprises a main body and a conductive ground plate mounted on the main body, a side of the conductive ground plate is provided with a cut, and the cut is configured to divide a conductive strip as an antenna from the conductive ground plate.

Wherein the cut comprises a first slit and a second slit that connect with each other, the first slit and the second slit are not in a straight line.

Wherein the first slit and the second slit are connected in an L shape.

Wherein one end of the conductive strip is a free end, and the other end of the conductive strip is connected to the remaining conductive ground plate.

Wherein a length of the conductive strip is in a range of 30 to 50 mm.

Wherein a width of the conductive strip is in a range of 3 to 5 mm.

Wherein a distance between the conductive strip and an upper end of the mobile terminal is less than a distance between the conductive strip and a lower end of the mobile terminal.

Wherein the main body is an insulating plate, the insulating plate is provided with an embedding groove, and the conductive ground plate is embedded in the embedding groove.

Wherein the mobile terminal further comprises a circuit board located below the front housing and a connecting elastic sheet between the front housing and the circuit board, one end of the connecting elastic sheet is electrically connected to the circuit board, and the other end of the connecting elastic sheet is electrically connected to the conductive strip.

Wherein an antenna matching circuit is provided on the circuit board, and the antenna matching circuit is electrically connected to the conductive strip through the connecting elastic sheet.

Beneficial effects of the present application are: different from the prior art, the mobile terminal in this embodiment comprises a front housing. The front housing comprises a main body and a conductive ground plate mounted on the main body. A side of the conductive ground plate is provided with a cut. The cut is configured to divide a conductive strip as an antenna from the conductive ground plate so that the existing conductive ground plate in the front housing of the mobile terminal can be used to realize the antenna without the need for antenna materials or antenna brackets, thereby reducing the material cost of the mobile terminal antenna.

BRIEF DESCRIPTION OF THE SEVERAL VIEW OF THE DRAWINGS

In order to more clearly illustrate technical solutions in embodiments of the present disclosure, a brief description of accompanying drawings used in a description of the embodi- FIG. 1 is a schematic structural diagram of a mobile terminal provided by an embodiment of the present application.

DESCRIPTION OF SPECIFIC EMBODIMENTS OF THE INVENTION

Figure 1:
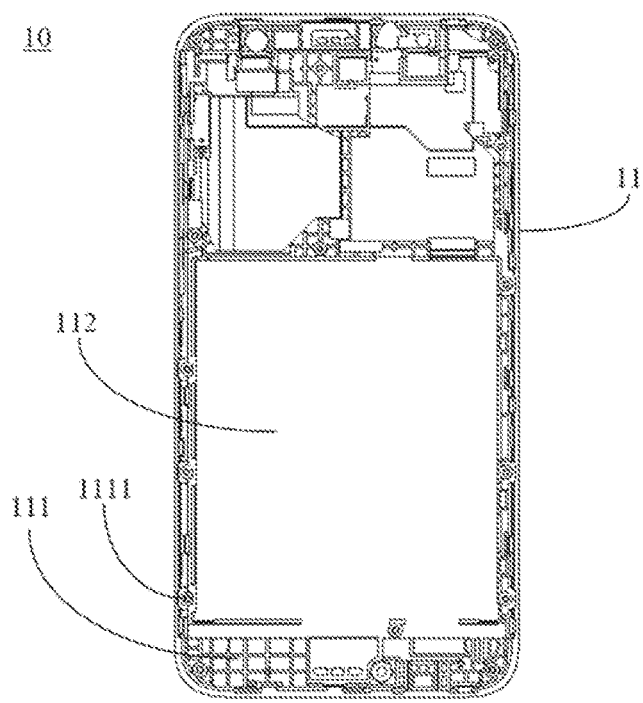

Technical solutions in embodiments of the present disclosure are clearly and completely described below in conjunction with accompanying drawings. It is apparent that the described embodiments are merely a part of the embodiments of the present disclosure and not all embodiments. All other embodiments obtained by those skilled in the art based on the embodiments of the present disclosure without creative labor are within the claimed scope of the present disclosure. In a case of no conflict, the following embodiments and their technical features can be combined with each other.

In the description of the present disclosure, it should be understood that location or position relationships indicated by terms, such as "center", "longitudinal", "transverse", "length", "width", "thickness", "up", "down", "front", "rear", "left", "right", "vertical", "horizontal", "top", "bottom", "inside", and "outside" are location or position relationships based on illustration of the accompanying drawings, are merely used for describing the present disclosure and simplifying the description instead of indicating or implying the indicated apparatuses or elements should have specified locations or be constructed and operated according to specified locations, and Thereof, should not be intercepted as limitations to the present disclosure. Furthermore, structural elements with same or similar characteristics may be indicated by same or different reference numerals in the present disclosure. In addition, terms such as "first" and "second" are used merely for description, but shall not be construed as indicating or implying relative importance or implicitly indicating a number of the indicated technical feature. Hence, the feature defined with "first" and "second" may explicitly or implicitly includes one or more such features. In the description of the present disclosure, a term "a plurality of" means "two or more" unless otherwise specifically limited.

At present, the antenna of mobile terminals are generally implemented by adopting a flexible printed circuit (FPC) antenna or a laser direct structuring (LDS) antenna. However, implementations of such mobile terminal antennas require appropriate antenna materials and corresponding antenna brackets, which will lead to a problem of higher material costs. For solving the above problems, embodiments of the present application provide a mobile terminal to reduce material costs of the mobile terminal antenna.

Figure 2:
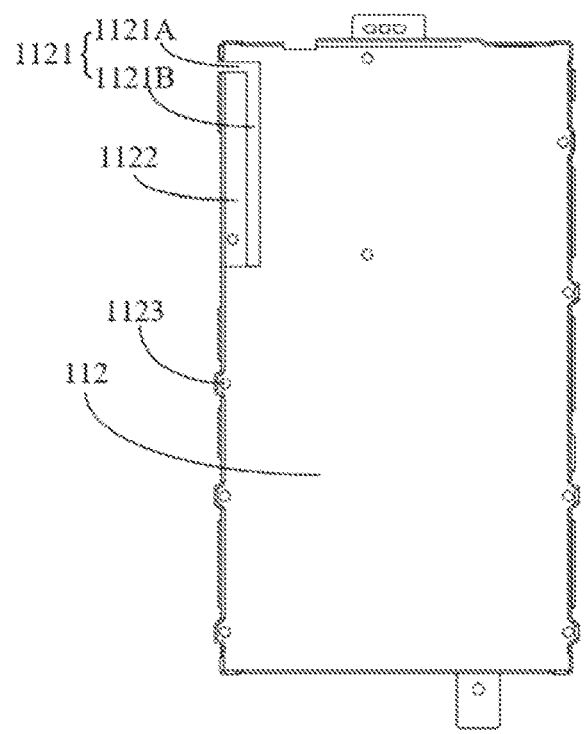
FIG. 2 is a schematic diagram of a structure of a conductive ground plate in FIG. 1.

Please refer to FIGS. 1 and 2. FIG. 1 is a schematic structural diagram of a mobile terminal provided by an embodiment of the present application, and FIG. 2 is a schematic structural diagram of a conductive ground plate in FIG. 1. As shown in FIGS. 1 and 2, the mobile terminal 10 comprises a front housing 11, which comprises a main body 111 and a conductive ground plate 112 mounted on the main body 111, wherein a cut 1121 is provided on a side of the conductive ground plate 112. The cut 1121 is configured to divide a conductive strip 1122 as an antenna from the conductive ground plate 112.

Different from the prior art, the mobile terminal in the present embodiment comprises a front housing, and the front housing comprises a main body and a conductive ground plate mounted on the main body. A side of the conductive ground plate is provided with a cut, and the cut is configured to divide a conductive strip as the antenna from the conductive ground plate, so that the existing conductive ground plate in the front housing of the mobile terminal can be used to realize an antenna without the need for antenna materials or antenna brackets, thereby reducing the material cost of a mobile terminal antenna.

Please continue to refer to FIGS. 1 and 2, the mobile terminal 10 comprises the front housing 11, the front housing 11 comprises the main body 111 and the conductive ground plate 112 mounted on the main body 111, wherein the conductive ground plate 112 is provided with a cut 1121 on the side. The cut 1121 is used to divide the conductive strip 1122 as an antenna from the conductive ground plate 112. Specifically, the material of the conductive ground plate 112 may be a metal conductive material, for example a metal conductive material such as stainless steel, iron, copper, aluminum alloy, magnesium alloy, magnesium aluminum alloy, or zinc alloy, etc., wherein the main body 111 may be an insulating plate 111. The material of the insulating plate 111 can be insulating materials such as plastic, rubber, etc., and the insulating plate 111 can also be provided with an embedded groove (not shown in the figure), and the conductive ground plate 112 is embedded in the embedded groove, wherein when the conductive ground plate 112 is embedded in the embedded groove of the insulating plate 111, the cut 1121 on the side of the conductive ground plate 112 will be filled by the insulating plate 111.

In the present embodiment, the conductive ground plate 112 in the front housing 11 can not only realize the grounding of the electronic components inside the mobile terminal 10, but also ensure the structural strength of the front housing 11. In addition, in specific implementation, during the processing of the front housing 11, the insulating plate 111 and the conductive ground plate 112 may be integrally formed by in-mold injection molding to obtain the front housing 11.

Wherein, please continue to refer to FIGS. 1 and 2, the conductive ground plate 112 may also be provided with positioning holes 1123, and the main body 111 is formed with nuts 1111 at the positioning holes 1123 of the conductive ground plate 112, and the nuts 1111 penetrate the main body 111 and reach the positioning holes 1123 on the conductive ground plate 112. In this way, during the assembly process of the mobile terminal 10, screws and nuts 1111 can be cooperatively used to fix the main board of the mobile terminal with screw holes on the front housing 11, or fix a rear housing of the mobile terminal 10 with screw holes on the front housing 11 mentioned above.

In this embodiment, the cut 1121 is provided on the side of the conductive ground plate 112 to divide the conductive strip 1122 from the conductive ground plate 112 for realizing the antenna of the mobile terminal 10. The method utilizes the existing conductive ground plate 112 in the front housing 10 of the mobile terminal without separately providing antenna consumables, thereby reducing the material cost of the mobile terminal antenna.

It should be noted that although the embodiment only provides one cut 1121 as an example, in other embodiments, the number of cuts 1121 provided on the side of the conductive ground plate 112 is not limited. For example, one or more cuts 1121 may be provided on the side of the conductive ground plate 112 according to actual needs. In addition, when the number of cuts 1121 provided on the side of the conductive ground plate 112 is multiple, the multiple cuts 1121 may be distributed on the same side of the conductive ground plate 112 at intervals, or may be seperatedly distributed on two adjacent sides or two opposite sides of the conductive ground plate 112, or may be seperatedly distributed on three or four adjacent sides of the conductive ground plate.

In addition, in a specific embodiment, in order to prevent the degradation of antenna performance caused by the user holding the mobile terminal, a distance between the conductive strip 1122 as the antenna and an upper end of the mobile terminal 10 can be set to be less than a distance between the conductive strip 1122 as the antenna and a lower end of the mobile terminal 10, that is, the above-mentioned conductive strip 1122 as an antenna can be arranged in or near the upper end of the mobile terminal 10. As such, since the user generally holds a lower end or a lower half of the mobile terminal 10 by hand, when the conductive strip 1122 as the antenna is placed in the upper end of the mobile terminal 10 or near the upper end of the mobile terminal 10, the conductive strip 1122 as the antenna of the mobile terminal 10 will not be easily blocked by the user's hand, thereby ensuring the antenna performance of the mobile terminal 10 when held by the user. It should be noted that the above-mentioned upper end and lower end are relative. Generally speaking, the lower end refers to a position close to the bottom of the mobile terminal 10, and the upper end refers to a position close to the top of the mobile terminal 10. The bottom and top generally refer to the bottom or top when the mobile terminal 10 is normally used by the user.

Specifically, in order to prevent the impact on the rigidity of the conductive ground plate 112 due to the cut 1121 being opened on the side of the conductive ground plate 112, which in turn affects the structural strength of the front housing 11, in the present embodiment, the cut 1121 on the side of the conductive ground plate 112 is arranged at a certain distance from the four corners of the conductive ground plate 112 to ensure the integrity of the conductive ground plate 112 at the four corners, thereby ensuring the rigidity of the conductive ground plate 112. Accordingly, the cut 1121 can be provided on the side of the conductive ground plate 112 to realize the antenna of the mobile terminal 10 while ensuring the structural strength of the front housing 11.

For example, when the cut 1121 on the side of the conductive ground plate 112 is located on the right side of the conductive ground plate 112, a distance between the cut 1121 on the side of the conductive ground plate 112 and the upper right corner of the conductive ground plate 112 may be 10-15 mm, so as to ensure the antenna performance of the mobile terminal 10 while also ensuring the structural strength of the front housing 11 of the mobile terminal 10. It should be noted that the right side and upper right corner of the conductive ground plate 112 generally refer to the right side and upper right corner of the conductive ground plate 112 when the mobile terminal 10 is used normally by a user.

In this embodiment, please continue to refer to FIG. 2, the cut 1121 on the side of the conductive ground plate 112 may specifically comprise a first slit 1121A and a second slit 1121B connected, and the first slit 1121A and the second slit 1121B are not in a straight line. The first slit 1121A can first extend a distance D1 along the width direction of the conductive strip 1122 from the side of the conductive ground plate 112, and then extend a distance D2 along the length direction of the conductive strip 1122 to obtain the above cut 1121. In a specific embodiment, the first slit 1121A and the second slit 1121B may be connected in an L shape, and the distance D1 that the first slit 1121A extends may be less than the distance D2 that the second slit 1121B extends. That is, the distance D1 that the first slit 1121A extends can be the same as the width of the conductive strip 1122 as an antenna described above, and the difference between the distance D2 that the second slit 1121B extends and the width of the first slit 1121A can be the same as the length of the conductive strip 1122 as an antenna described above.

Wherein, in order to prevent the widths of the first slit 1121A and the second slit 1121B of the cut 1121 from being too large and affecting the rigidity of the conductive ground plate 112, the widths of the first slit 1121A and the second slit 1121B of the above-mentioned cut 1121 in the present embodiment are reduced as much as possible under the premise that the antenna performance of the conductive strip 1122 as an antenna in the conductive ground plate 112 is not affected. For example, in a specific embodiment, the range of the width of the first slit 1121A and the second slit 1121B of the above-mentioned cut 1121 may be 2.5-4 mm.

Wherein, the length of the conductive strip 1122 as the antenna in the conductive ground plate 112 can be adjusted according to the antenna frequency band that needs to be implemented in actual situations. In the present embodiment, the length L of the conductive strip 1122 as the antenna in the conductive ground plate 112 and the antenna operating frequency $\gamma$ basically satisfy the equation: $\gamma = c/(4L)$, where c is the speed of light. In a specific embodiment, the length of the conductive strip 1122 as an antenna in the conductive ground plate 112 may range from 30 to 50 mm, and the width of the conductive strip 1122 as an antenna in the conductive ground plate 112 may range from 3 to 5 mm.

In addition, in specific implementation, if there are multiple antenna frequency bands of the mobile terminal 10 to be implemented, a plurality of cuts 1121 can be provided on the side of the conductive ground plate 112 to divide more conductive ground plate 112 with different lengths, wherein each antenna frequency band to be implemented corresponds to at least one conductive strip 1122.

In addition, it should be noted that although the present embodiment only provides a cut 1121 for dividing a conductive strip 1122 from the conductive ground plate 112 as an example, in other embodiments, a cut 1121 can also be used for dividing two or more conductive strips 1122 from the conductive ground plate 112 described above.

In the present embodiment, one end of the conductive strip 1122 as an antenna in the conductive ground plate 112 may be a free end, and the other end may be connected to the remaining conductive ground plate 112. Wherein, the remaining conductive ground plate 112 refers to the other part of the conductive ground plate 112 except the conductive strip 1122 as the antenna. Specifically, the conductive strip 1122 as the antenna in the conductive ground plate 112 and the remaining conductive ground plate 112 can realize the grounding of the antenna. That is, in the conductive ground plate 112, the one end of the conductive strip 1122 as the antenna connected to the remaining conductive ground plate 112 is equivalent to a ground point of the antenna. In addition, the free end of the conductive strip 1122 as the antenna and a point or an area of the antenna location of the conductive strip 1122 of the antenna at or close to the conductive strip 1122 as the antenna can be selected to serve as an antenna feed point.

Figure 3:
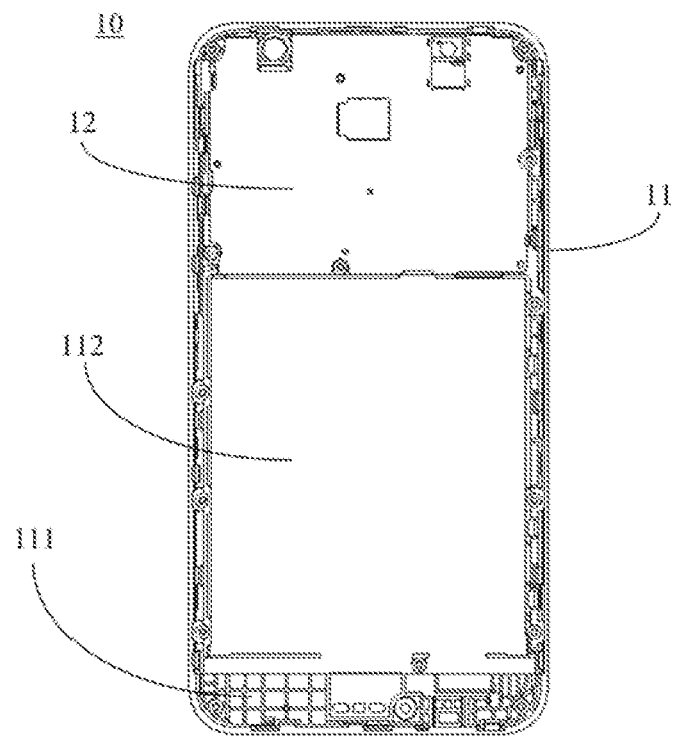
FIG. 3 is another schematic structural diagram of the mobile terminal provided by an embodiment of the present application.
Figure 4:
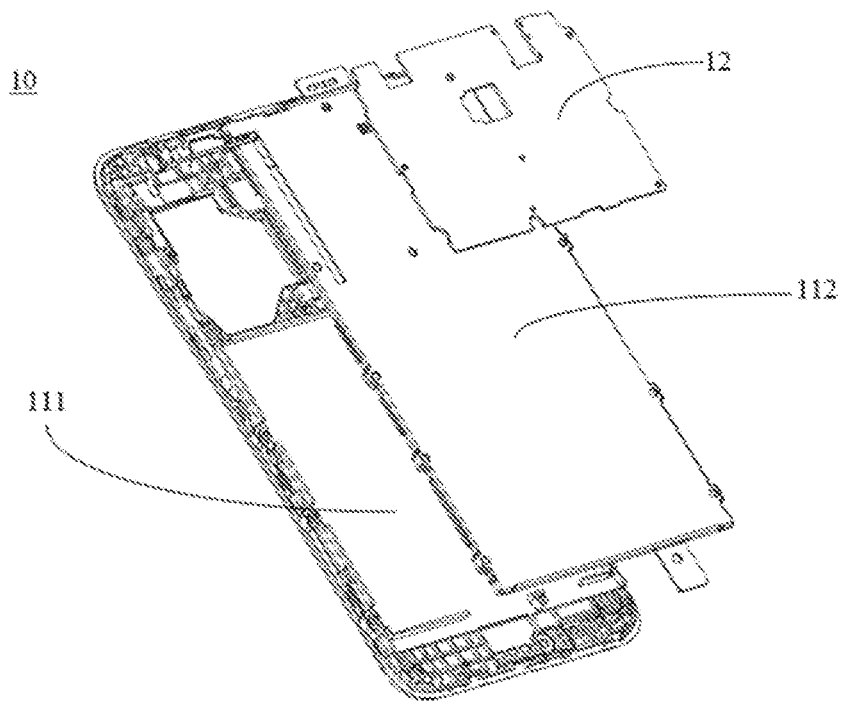
FIG. 4 is an exploded view of the mobile terminal in FIG. 3.
Figure 5:
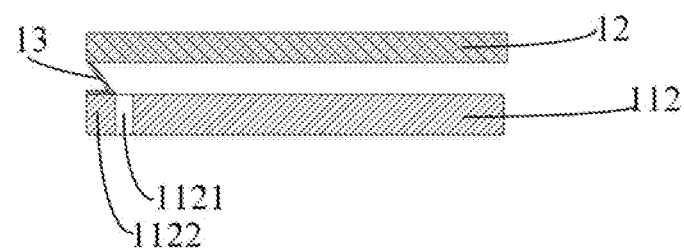
FIG. 5 is a schematic structural diagram of an electrical connection between the conductive ground plate and a circuit board in FIG. 3.

In a specific embodiment, please refer to FIGS. 3 to 5. FIG. 3 is a schematic diagram of a back structure of the mobile terminal provided by an embodiment of the present application, FIG. 4 is an exploded view of the mobile terminal in FIG. 3, and FIG. 5 is a schematic diagram of the electrical connection between the conductive ground plate and the circuit board in FIG. 3. As shown in FIGS. 3 to 5, the mobile terminal 10 may also comprise a circuit board 12 located below the front housing 11, and a connecting elastic sheet 13 between the front housing 11 and the circuit board 12. One end of the connecting elastic sheet 13 is electrically connected to the circuit board 12, and the other end is in electrical contact with a conductive strip 1122 located in the front housing 11 as an antenna.

Specifically, the circuit board 12 may also be provided with an antenna feeder (not shown in the figures), one end of the connecting elastic sheet 13 may be electrically connected to the antenna feeder on the circuit board 12, and the other end of the conductive strip 1122 as the antenna may be in electrically contact with the conductive ground plate 112. In this way, the antenna feeder on the circuit board 12 can transmit electromagnetic wave signals to the conductive strip 1122 as the antenna in the conductive ground plate 112 through the connecting elastic sheet 13, so as to radiate energy. Or, the antenna feeder on the circuit board 12 can also obtain the signal received by the conductive strip 1122 as the antenna in the conductive ground plate 112 through the connecting elastic sheet 13.

In some specific embodiments, in order to adjust the antenna performance of the conductive strip 1122 as an antenna in the conductive ground plate 112, an antenna matching circuit (not shown in the figures) may also be provided on the circuit board 12. The antenna matching circuit is electrically connected to the conductive strip 1122 as an antenna in the conductive ground plate 112 through the connecting elastic sheet 13. Specifically, the antenna feeder on the circuit board 12 and the antenna matching circuit may be electrically connected, and the connecting elastic sheet 13 is directly connected to the electrically connected antenna feeder and the antenna matching circuit in the circuit board 12, and is directly connected to the antenna feeder therein. In this way, while feeding the conductive strip 1122 as an antenna in the conductive ground plate 112, a matching impedance of the conductive strip 1122 as an antenna in the conductive ground plate 112 can be realized, thereby ensuring good antenna performance of the mobile terminal 10.

Specifically, the antenna matching antenna may comprise a n-type impedance matching circuit and/or a double L-type impedance matching circuit, wherein the antenna matching circuit may comprise at least one capacitor and at least one inductor, and, in specific implementation, appropriate capacitance and inductance values are selected to achieve impedance matching to the antenna of the selected frequency band.

It should be noted that when there are multiple antenna frequency bands of the mobile terminal 10 that need to be implemented, that is, when the number of conductive strips 1122 as antennas in the conductive ground plate 112 is multiple, multiple antenna matching circuits and multiple antenna feeders can be installed on the circuit board 12. The antenna matching circuit on the circuit board 12 can correspond to the conductive strip 1122 as the antenna in the conductive ground plate 112, and the antenna feeder on the circuit board 12 can be in one-to-one correspondence with the conductive strips 1122 as the antenna in the conductive ground plate 112. In addition, the antenna frequency band that the mobile terminal 10 needs to implement may comprise 2G (900 MHz), 4G (700-2600 MHz), WIFI and Bluetooth (2.4 GHz), or GPS (1.5 GHz).

In some other specific embodiments, please continue to refer to FIG. 5, during the assembly and production process of the mobile terminal 10, in order to achieve good electrical connection between the connecting elastic sheet 13 and the conductive strip 1122 as the antenna in the conductive ground plate 112, one end of the connecting elastic sheet 13 can be first electrically connected to the circuit board 12 by welding, and then the circuit board 12 and the front housing 11 can be fixed as a whole by a fixing method such as a buckle or a screw, so as to realize that the other end of the connecting elastic sheet 13 is in close contact with the conductive strip 1122 as the antenna in the conductive ground plate 112. Wherein the end of the connecting elastic sheet 13 that is in electrical contact with the one end of the conductive ground plate 112 as the antenna in the conductive strip 1122 has a contact surface. That is, the connecting elastic sheet 13 is in electrical contact with the lower surface of the conductive strip 1122 as an antenna in the conductive ground plate 112 through the contact surface. In this way, the electrical contact effect between the connecting elastic sheet 13 and the conductive strips 1122 as the antenna in the conductive ground plate 112 can be further improved.

In addition, in order to further improve the electrical contact effect between the connecting elastic sheet 13 and the conductive strip 1122 as the antenna in the conductive ground plate 112, the width of the conductive strip 1122 as the antenna in the conductive ground plate 112 should be wide enough. In order to make the contact area between the connecting elastic sheet 13 and the conductive strip 1122 as the antenna in the conductive ground plate 112 be sufficiently wide, in a specific embodiment, the width can the conductive strip 1122 in the conductive ground plate 112 used as an antenna ranges from 3 to 5 mm.

In some embodiments, the conductive strip 1122 as an antenna in the conductive ground plate 112 can be specifically used to implement a diversity antenna of the mobile terminal 10. That is, the conductive strip 1122 as an antenna in the conductive ground plate 112 can only receive signals and does not emit a signal. In addition, in order to realize the main antenna of the mobile terminal 10, a flexible printed circuit (FPC) or laser direct structuring (LDS) antenna can be used. Among them, the main antenna of the mobile terminal 10 can either receive signals or transmit signals. Specifically, the main antenna of the mobile terminal 10 may be arranged in the lower end of the mobile terminal 10 or in the rear housing of the mobile terminal 10. In this way, the mobile terminal 10 adopts the antenna design of the diversity antenna and the main antenna, which can offset the influence of fast fading on the received signal. Since the signal generates multipath component signals due to interference such as reflection during transmission, the receiving end uses multiple antennas to simultaneously receive different signals. The signals of the path are then selected and combined into a total signal to reduce the influence of signal fading. This is called diversity reception. Diversity is to combine the scattered signals together. As long as several signals are independent of each other, the maximum signal gain can be obtained after proper combination.

In a specific embodiment, the above-mentioned mobile terminal 10 may further comprise a rear housing (not shown in the figure) matching the size and shape of the front housing 11, and the circuit board 12 is installed between the front housing 11 and the rear housing. Wherein, the circuit board 12 and the front housing 11 or the rear housing can be fixed in any manner, specifically, they can be fixed by nuts or bolts, and can also be fixed by buckles.

Wherein, the material of the rear housing can be metal, such as aluminum alloy and stainless steel. The metal rear housing has a better appearance. In other embodiments, the material of the rear housing can also be plastic, ceramic, or glass.

Further, the above-mentioned mobile terminal 10 may further comprise a display screen (not shown in the figure), the display screen is arranged on the front housing 11, and the front housing 11 can provide support for the display screen. Specifically, the display screen may use a liquid crystal display (LCD) screen for displaying information, and the LCD screen may be a thin film transistor (TFT) screen or an in-plane switching (IPS) screen or splice liquid crystal display (SLCD) screen. In other embodiments, the display screen can also use an organic light-emitting diode (OLED) screen for displaying information, and the OLED screen can be active matrix organic light emitting diode (AMOLED) screen or super active matrix organic light emitting diode (Super AMOLED) screen or super active matrix organic light emitting diode plus (Super AMOLED Plus) screen.

In the above embodiment, the mobile terminal 10 comprises, but is not limited to, a smart phone and a tablet computer.

Different from the prior art, the mobile terminal in this embodiment comprises a front housing. The front housing comprises a main body and a conductive ground plate mounted on the main body. A side of the conductive ground plate is provided with a cut. The cut is configured to divide a conductive strip as an antenna from the conductive ground plate so that the existing conductive ground plate in the front housing of the mobile terminal can be used to realize the antenna without the need for antenna materials or antenna brackets, thereby reducing the material cost of the mobile terminal antenna.

The above is a detailed introduction to a mobile terminal provided by an embodiment of the present application. Specific examples are used in this article to illustrate the principles and implementation of the present application. Its core idea, at the same time, for those skilled in the art, according to the idea of this application, there will be changes in the specific implementation and scope of application. In summary, the content of this specification should not be construed as a limitation to this application.

What is claimed is:

1. A mobile terminal, comprising:
    a front housing, wherein the front housing comprises a main body and a conductive ground plate mounted on the main body, a side of the conductive ground plate is provided with a cut, and the cut is configured to divide a conductive strip as an antenna from the conductive ground plate;
    wherein the cut comprises a first slit and a second slit that connect with each other, the first slit and the second slit are not in a straight line, one end of the conductive strip is a free end, and the other end of the conductive strip is connected to the conductive ground plate, and
    wherein the conductive strip has a linear strip shape;
    wherein the mobile terminal further comprises a circuit board located below the front housing and a connecting elastic sheet between the front housing and the circuit board, one end of the connecting elastic sheet is electrically connected to the circuit board, and the other end of the connecting elastic sheet is electrically connected to the conductive strip.

2. The mobile terminal of claim 1, wherein the first slit and the second slit are connected in an L shape.

3. The mobile terminal according to claim 1, wherein a length of the conductive strip is in a range of 30 mm to 50 mm.

4. The mobile terminal of claim 1, wherein a width of the conductive strip is in a range of 3 mm to 5 mm.

5. The mobile terminal of claim 1, wherein a distance between the conductive strip and an upper end of the mobile terminal is less than a distance between the conductive strip and a lower end of the mobile terminal.

6. The mobile terminal of claim 1, wherein the main body is an insulating plate, the insulating plate is provided with an embedding groove, and the conductive ground plate is embedded in the embedding groove.

7. The mobile terminal of claim 1, wherein an antenna matching circuit is provided on the circuit board, and the antenna matching circuit is electrically connected to the conductive strip through the connecting elastic sheet.

8. The mobile terminal of claim 1, wherein a number of the cut is one or more.

9. The mobile terminal of claim 8, wherein the number of the cut is multiple, and the multiple cuts are respectively distributed on two adjacent sides or two opposite sides of the conductive ground plate.

10. A mobile terminal, comprising:
    a front housing, wherein the front housing comprises a main body and a conductive ground plate mounted on the main body, a side of the conductive ground plate is provided with a cut, and the cut is configured to divide a conductive strip as an antenna from the conductive ground plate, and
    wherein the conductive strip has a linear strip shape;
    wherein the mobile terminal further comprises a circuit board located below the front housing and a connecting elastic sheet between the front housing and the circuit board, one end of the connecting elastic sheet is electrically connected to the circuit board, and the other end of the connecting elastic sheet is electrically connected to the conductive strip.

11. The mobile terminal of claim 10, wherein the cut comprises a first slit and a second slit that connect with each other, and the first slit and the second slit are not in a straight line.

12. The mobile terminal of claim 11, wherein the first slit and the second slit are connected in an L shape.

13. The mobile terminal of claim 10, wherein one end of the conductive strip is a free end, and the other end of the conductive strip is connected to the conductive ground plate.

14. The mobile terminal of claim 10, wherein a length of the conductive strip is in a range of 30 mm to 50 mm.

15. The mobile terminal of claim 10, wherein a width of the conductive strip is in a range of 3 mm to 5 mm.

16. The mobile terminal of claim 10, wherein a distance between the conductive strip and an upper end of the mobile terminal is less than a distance between the conductive strip and a lower end of the mobile terminal.

17. The mobile terminal of claim 10, wherein the main body is an insulating plate, the insulating plate is provided with an embedding groove, and the conductive ground plate is embedded in the embedding groove.

18. The mobile terminal of claim 10, wherein an antenna matching circuit is provided on the circuit board, and the antenna matching circuit is electrically connected to the conductive strip through the connecting elastic sheet.

* * * * *